(12) United States Patent
Lee

(10) Patent No.: US 9,265,126 B2
(45) Date of Patent: Feb. 16, 2016

(54) METHOD AND APPARATUS FOR USING PORTABLE TERMINAL

(71) Applicant: Samsung Electronics Co., Ltd., Gyeonggi-do (KR)

(72) Inventor: Won-Wook Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 172 days.

(21) Appl. No.: 13/860,733

(22) Filed: Apr. 11, 2013

(65) Prior Publication Data
US 2013/0271013 A1 Oct. 17, 2013

(30) Foreign Application Priority Data

Apr. 17, 2012 (KR) .................. 10-2012-0039671

(51) Int. Cl.
*H04M 1/22* (2006.01)
*H05B 37/02* (2006.01)

(52) U.S. Cl.
CPC ............ *H05B 37/02* (2013.01); *H04M 1/22* (2013.01); *H04M 2250/12* (2013.01); *Y02B 20/46* (2013.01)

(58) Field of Classification Search
CPC ....... H04M 1/0202; H04M 1/22; Y02B 20/46
See application file for complete search history.

(56) References Cited

U.S. PATENT DOCUMENTS 8,740,640 B2 * 6/2014 Hardy .................. 439/490
2009/0312987 A1 * 12/2009 Uedaira et al. ............ 702/189

FOREIGN PATENT DOCUMENTS

| EP | 1227642 A1 | 7/2002 |
|---|---|---|
| JP | 05-167658 A | 7/1993 |
| JP | 2004-235702 A | 8/2004 |
| KR | 10-2001-0004515 A | 1/2001 |
| KR | 10-2005-0001979 A | 1/2005 |
| KR | 10-2005-0026207 A | 3/2005 |
| KR | 10-2005-0102315 A | 10/2005 |
| KR | 10-0532597 B1 | 12/2005 |
| KR | 10-2007-0016202 A | 2/2007 |
| KR | 10-2008-0006989 A | 1/2008 |

OTHER PUBLICATIONS

Hoque, Mohammad R., et al.; "A CMOS Under-Voltage Lockout Circuit;" Proceedings of the World Congress on Engineering & Computer Science 2008 (WCECS 2008); Oct. 22-24, 2008; XP055067662; 4 pgs.; [ http://www.iaeng.org/publication/WCECS2008/WCECS2008_pp173-176.pdf ] Rtrvd Jun. 21, 2013.
Korean Office Action dated Aug. 29, 2013 in connection with Korean Application No. KR 10-2012-0039671.

\* cited by examiner

*Primary Examiner* — Patrick O'Neill
(74) *Attorney, Agent, or Firm* — Cha & Reiter, LLC.

(57) ABSTRACT

A method for using a portable terminal in a dark environment by checking a battery level and an ambient illuminance; and driving a light-emitting unit corresponding to a preset terminal according to predetermined criteria based on the check outcome.

14 Claims, 3 Drawing Sheets

METHOD AND APPARATUS FOR USING PORTABLE TERMINAL

CLAIM OF PRIORITY

This application claims the benefit under 35 U.S.C. §119 (a) of a Korean Patent Application filed in the Korean Intellectual Property Office on Apr. 17, 2012 and assigned Ser. No. 10-2012-0039671, the entire disclosure of which is incorporated herein by reference.

BACKGROUND OF THE INVENTION

1 Field of the Invention

The present invention relates generally to a portable terminal, and more particularly, to a method and apparatus associated with the charging of a portable terminal battery.

2. Description of the Related Art With the diversity and convenience of the features provided in tablet computers such as Galaxy Tab® and smart phones such as Galaxy series®, for example, the use of these portable devices is becoming increasingly popular.

However, a number of diverse features provided in the portable terminals lead to an increase in the user's portable terminal usage time, which in turn cause a rapid battery loss in the portable terminals. As result, the latest multifunctional portable terminals require more frequent battery charging, compared with the cell phones with only simple calling features.

Generally, portable terminals are charged by inserting a charging cable into a charging terminal mounted in the main body of the portable terminals. However, it is not easy for users to exactly align and insert the charging cable into the charging terminal, especially in a dark room, because of the small size and peculiar shape of the charging terminal.

Therefore, there is a need for a portable terminal to allow a user to charge the portable terminal even in a dark environment in more easier and convenient manner.

SUMMARY OF THE INVENTION

An aspect of an exemplary embodiment of the present invention is to provide a portable terminal that would allow a user to more easily and conveniently charge or use the portable terminal in a dark environment.

In accordance with one aspect of the present invention, a method for using a portable terminal includes checking a battery level and an ambient illuminance; and driving a light-emitting unit corresponding to one of terminals based on the check outcome.

In accordance with another aspect of the present invention, an apparatus for using a portable terminal includes a battery for supplying operation power to the portable terminal; an illuminance sensor for checking an ambient illuminance of the portable terminal; and a controller for checking a battery level and an ambient illuminance, and driving a light-emitting unit corresponding to one of terminals based on the check outcome.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
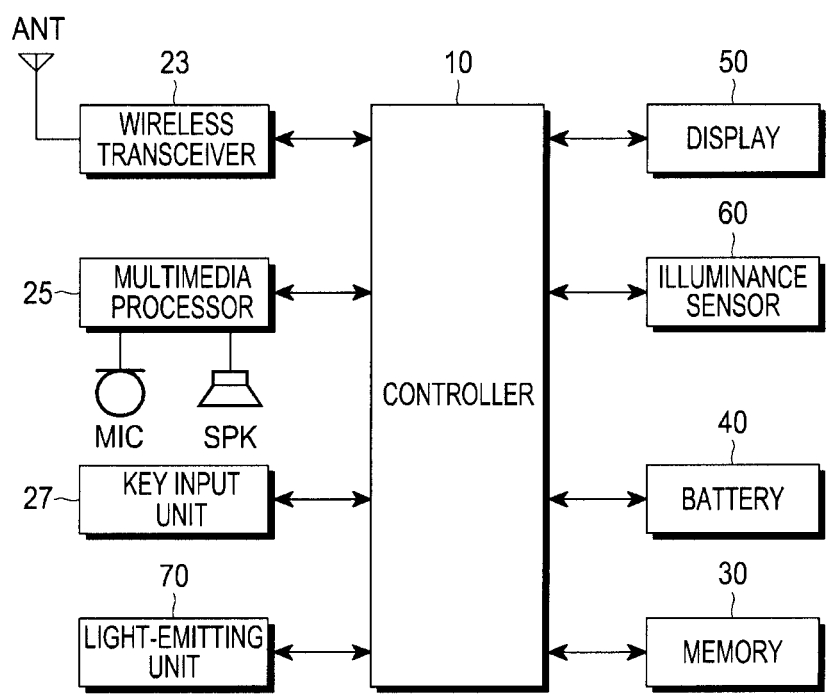
FIG. 1 shows a structure of a portable terminal according to an embodiment of the present invention.

FIG. 1 shows a structure of a portable terminal according to an embodiment of the present invention. A portable terminal, to which an embodiment of the present invention is applicable, may be an easy-to-carry mobile electronic device. The terminal may be an electronic device capable of displaying a plurality of items, such as a videophone, a feature phone, a smart phone, an International Mobile Telecommunication 2000 (IMT-200) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an e-Book terminal, a portable computer (such as a laptop computer and a tablet computer), and a digital camera.

The portable terminal, to which an embodiment of the present invention is applicable, will be described below with reference to FIG. 1.

A wireless transceiver 23 includes a Radio Frequency (RF) unit and a Modulator/Demodulator (MODEM). The RF unit includes an RF transmitter for up-converting a frequency of transmission signals and amplifying the up-converted transmission signals, and an RF receiver for low-noise-amplifying received signals and down-converting a frequency of the amplified received signals. The modem includes a transmitter for coding and modulating transmission signals, and a receiver for demodulating and decoding signals received from the RF unit.

A multimedia processor 25 may constitute a coder/decoder (codec), and the codec includes a data codec, an audio codec, and a video codec. The data codec processes packet data and the like, and the audio codec and the video codec process audio signals (e.g., voice) and video signals (e.g., multimedia files), respectively. The multimedia processor 25 may convert digital audio signals received from the modem in the wireless transceiver 23 into analog audio signals using the audio codec, and play the analog audio signals using a speaker SPK. The multimedia processor 25 may convert analog audio signals picked up by a microphone MIC into digital audio signals using the audio codec, and transfer the digital audio signals to the modem in the wireless transceiver 23. The above-stated codecs may be provided separately, or may be included in a controller 10 on an integrated way. Alternatively, the controller 10 may have a function of the multimedia processor 25.

A key input unit 27 may include alphanumeric/character keys needed to input numeric/character information, and function keys (or a touchpad) needed to set various functions. When a display 50 has a capacitive or resistive touch screen, the key input unit 27 may include a minimum number of preset keys and the display 50 may replace some of the key input functions of the key input unit 27.

A memory 30 may include a program memory and a data memory. The program memory may store a control program for controlling the general operation of the portable terminal. The memory 30 may further include an external memory such as a Compact Flash (CF) card, a Secure Digital (SD) card, a Micro Secure Digital (Micro-SD) card, a Mini Secure Digital (Mini-SD) card, an Extreme Digital (xD) card, and a memory stick. The memory 30 may also include a storage disk such as a Hard Disk Drive (HDD) and a Solid State Disk (SSD).

A battery 40 supplies the power needed for operations of the portable terminal The controller 10 controls driving of the portable terminal by adjusting the supplied power at a level required in each component of the portable terminal. The controller 10 may receive battery information for the battery 40 such as battery level (e.g., remaining battery capacity) information and battery temperature information, from a battery management unit (not shown).

The display 50 may be a Liquid Crystal Display (LCD) display or an Organic Light Emitting Diode (OLED) display. OLED may be classified into Passive Mode OLED (PMOLED) and Active Mode OLED (AMOLED). The display 50 outputs or displays a variety of display information generated in the portable terminal. The display 50 includes a capacitive or resistive touch screen. The display 50, together with the key input unit 27, may serve as an input unit for controlling the portable terminal.

In accordance with an embodiment of the present invention, the display 50 may display a battery level (e.g., remaining battery capacity) for the battery 40. To this end, for example, an indicator bar may be displayed in the form of an icon or percentage.

An illuminance sensor 60 is a device for measuring the amount of ambient light around the portable terminal. Generally, the illuminance sensor 60 is used to adaptively control brightness of the display 50 depending on the amount (i.e., illuminance) of ambient light around the portable terminal In accordance with an embodiment of the present invention, the illuminance sensor 60 is used to drive a light-emitting unit after comparing the battery level (e.g., the battery voltage level or remaining battery capacity) for the battery 40 with a preset level.

A light-emitting unit 70 is a light-emitting device (e.g., Light Emitting Diode (LED) device) that emits light when preset conditions are met in an embodiment of the present invention. The light-emitting unit 70 may be implemented using a variety of devices by which users may recognize emission of light.

The controller 10 controls the overall operation of the portable terminal, and may switch and control operations of the portable terminal depending on the user inputs received from the key input unit 27 and/or the display 50. In accordance with an embodiment of the present invention, the controller 10 checks or measures a battery level and an ambient illuminance, and drives a light-emitting unit corresponding to a preset terminal depending on the check outcome for the battery level and the ambient illuminance.

Although devices that can be included in the portable terminal, such as a Bluetooth module, a camera module, a WiFi module, an acceleration sensor, a proximity sensor, a geomagnetic sensor, and a Digital Multimedia Broadcasting (DMB) receiver, are not shown in FIG. 1, it will be apparent to those of ordinary skill in the art that these devices may also be included in the portable terminal to provide their unique functions.

For example, if a battery level is dropped below a preset level, indicating that there is not much time left to drive the portable terminal, then background applications related to driving of a Bluetooth module, a camera module, a WiFi module, an acceleration sensor, a proximity sensor, a geomagnetic sensor, and a DMB receiver, may be automatically terminated.

Figure 2:
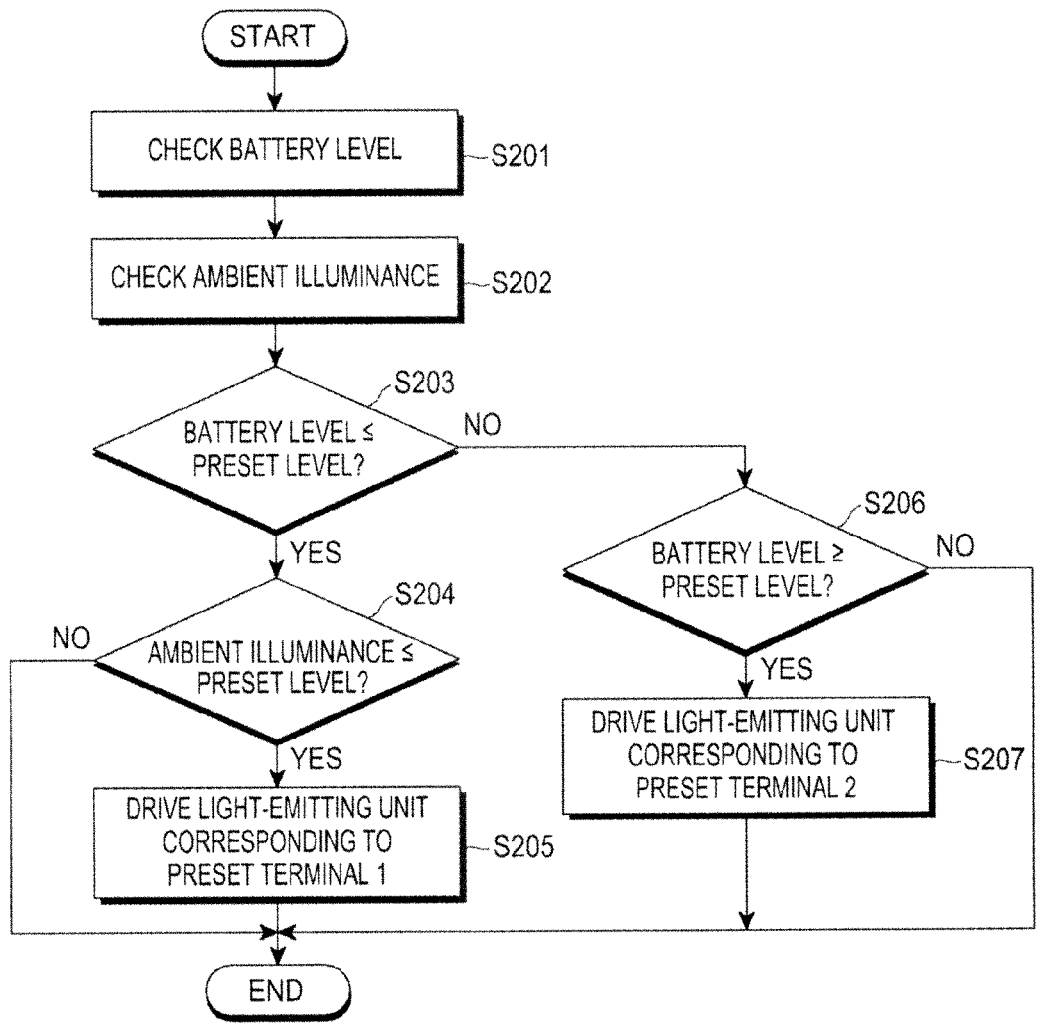
FIG. 2 shows a process of using a portable terminal according to an embodiment of the present invention.
Figure 3:
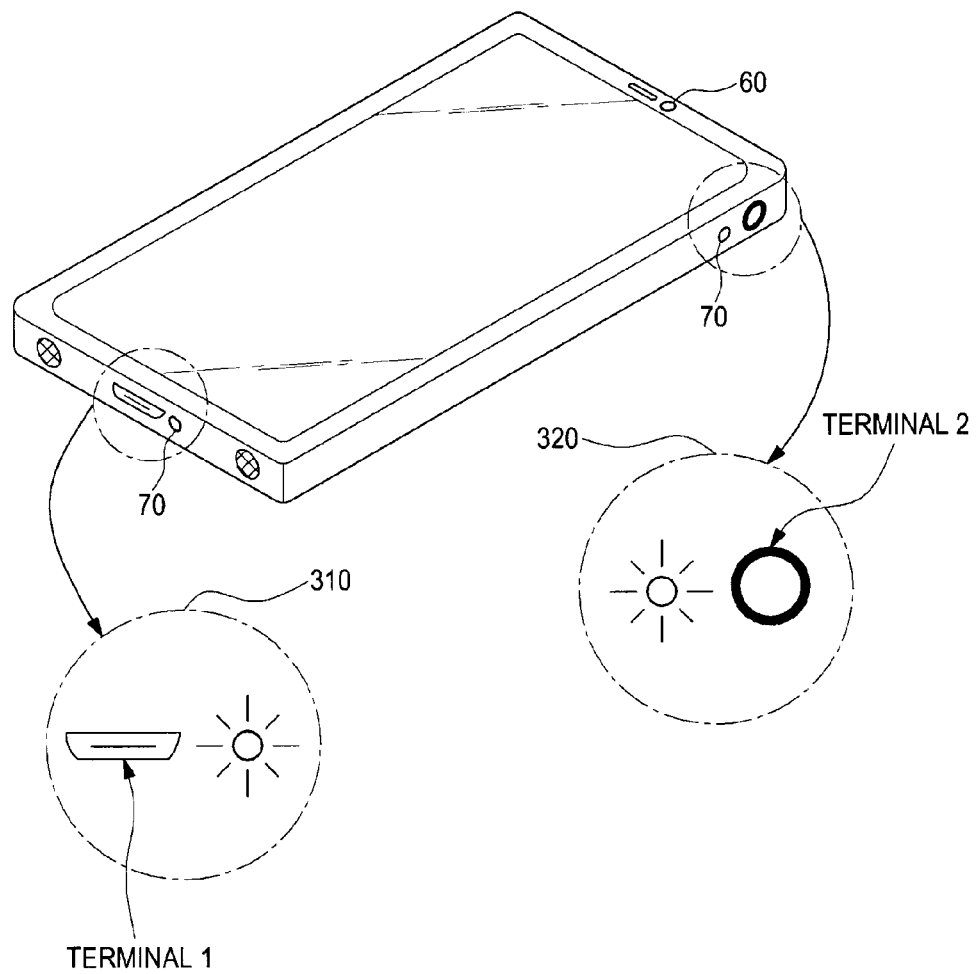
FIG. 3 is a view for description of a process of using a portable terminal according to an embodiment of the present invention.

FIG. 2 shows a process of using a portable terminal according to an embodiment of the present invention, and FIG. 3 is a view for description of a process of using a portable terminal according to an embodiment of the present invention.

Referring to FIG. 2, in steps S201 and S202, the controller 10 checks a current battery level of the battery 40, and then checks an ambient illuminance around the portable terminal using the illuminance sensor 60.

The controller 10 may receive battery information (e.g., battery charging level information and battery temperature information) received from a battery management unit (not shown), and may check an ambient illuminance (or level of an ambient illuminance) of the portable terminal using the illuminance sensor 60.

In steps S203 to S205, the controller 10 may drive a light-emitting unit corresponding to a preset first terminal, if the battery level is lower than or equal to a preset level and the ambient illuminance is lower than or equal to a preset level. The first terminal may be a charging terminal into which a charging cable may be inserted to charge the battery.

The controller 10 may drive the light-emitting unit corresponding to the preset first terminal, if the checked battery level is lower than or equal to the preset level (e.g., a battery level indicating the power capable of driving the portable terminal for about 10 minutes), and the checked ambient illuminance is lower than or equal to the preset level (e.g., illuminance of 50 lux or less) at which users may feel visually dark.

In an embodiment of the present invention, the first terminal to which a charging cable may be inserted to charge the battery. The user is highly likely to attempt to charge the battery, if the battery level is lower than or equal to a preset level.

However, when attempting to charge the battery in the low-illuminance place such as a room, the user may have difficulty in discerning the exact position of the charging terminal into which he/she will insert the charging cable. Therefore, the present invention provides a function of allowing the user to easily identify the position of the charging terminal by driving the light-emitting unit corresponding to the charging terminal, if the battery level is lower than or equal to a preset level (at which the battery needs to be charged), and the ambient illuminance is also lower than or equal to a preset level (at which the user may have difficulty in finding the exact position of the charging terminal).

Referring to FIG. 3, if it is determined that the battery needs to be charged in the dark place, by checking the battery level and the ambient illuminance, the controller 10 drives the light-emitting unit (e.g., LED) corresponding to the charging terminal (e.g., first terminal) as shown by reference numeral 310, so the user may correctly identify the position of the charging terminal with the help of the light emitted from the LED and easily insert the charging cable into the charging terminal.

Thereafter, in accordance with an embodiment of the present invention, the controller 10 may stop the driving of the light-emitting unit, if the charging cable is inserted into the charging terminal (first terminal) or the power is supplied to the battery.

Although the preset level for the ambient illuminance is changed by modification of the embodiment, it is preferable to set the preset level in accordance with the standard of American National Standards Institute (ANSI). For example, ANSI provides that an ambient illuminance of 0.01 lux corresponds to the brightness of the new moon, an ambient illuminance of 1 lux corresponds to the brightness of the full moon, an ambient illuminance of 3.4 lux corresponds to the brightness of the dark twilight, an ambient illuminance of 50 lux corresponds to the brightness of the living room, and an ambient illuminance of 80 lux corresponds to the brightness of the hallway or bathroom. Therefore, it may be preferable that the preset level for the ambient illuminance is 50 lux or less.

In steps S206 and S207, the controller 10 may drive a light-emitting unit corresponding to a preset second terminal, if the battery level is higher than or equal to the preset level and the ambient illuminance is lower than or equal to the preset level.

In the example described with reference to steps S203 to S205, if the battery level is low and the surroundings are dark, the controller 10 drives the light-emitting unit 70 corresponding to (in the vicinity of) the charging terminal, allowing the user to easily charge the battery. In contrast, in the example described with reference to steps S206 and S207, if the battery level is higher than or equal to (to be specific, exceeds) the preset level, indicating that the remaining battery capacity is sufficient, but the ambient illuminance is lower than or equal to the preset level, indicating that the surroundings are dark, then the controller 10 drives the light-emitting unit (e.g., LED) corresponding to the second terminal, allowing the user to easily insert a specific cable (e.g., earphone cable) into a specific terminal (e.g., earphone jack).

Even though the ambient illuminance is low, if the light-emitting unit corresponding to the specific terminal (e.g., second terminal) is continuously driven, consumption of the battery power may increase, thus reducing the possible runtime of the portable terminal. However, in the example of steps S206 and S207, as the battery level is higher than or equal to the preset level, indicating that the remaining battery capacity is sufficient, the user does not need to be concerned about the consumption of the battery power due to the driving of the light-emitting unit.

Accordingly, if the remaining battery capacity for the battery 40 is sufficient and the surroundings are visually dark (i.e., if the user does not need to charge the battery in the dark place), the controller 10 drives the light-emitting unit 70 corresponding to the preset second terminal (e.g., earphone connection terminal) as shown by reference numeral 320. In this way, the user may easily insert an external sound output device such as an earphone into the earphone connection terminal Although in the embodiment of the present invention, the second terminal is assumed to be an earphone connection terminal into which an external sound output device such as an earphone may be inserted, the second terminal may be used to receive other input devices. In addition, the controller 10 may stop the driving of the light-emitting unit if the earphone is inserted into the earphone connection terminal.

As is apparent from the foregoing description, an exemplary embodiment of the present invention makes it possible for the user to more easily and conveniently charge the portable terminal in a dark surrounding.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for using a portable terminal in a dark environment, the method comprising:
checking a battery level of the portable terminal and an ambient illuminance surrounding the portable terminal, wherein a first light emitting device and a second light emitting device correspond to a first terminal and a second terminal, respectively; and
driving one of the first light-emitting device and the second light emitting device based on the checked battery level and the ambient illuminance.

2. The method of claim 1, wherein the driving comprises driving the first light-emitting device corresponding to the first terminal when the battery level is lower than or equal to a preset level and a level of the ambient illuminance is lower than or equal to a preset level.

3. The method of claim 2, wherein the first terminal is a charging terminal used to charge a battery of the portable terminal.

4. The method of claim 3, further comprising stopping the driving of the first light-emitting device when the battery is being charged or when a charging cable is inserted into the first terminal.

5. The method of claim 1, wherein the driving comprises driving the second light-emitting device corresponding to the second terminal when the battery level is higher than or equal to a preset level and a level of the ambient illuminance is lower than or equal to a preset level.

6. The method of claim 5, wherein the second terminal is an earphone connection terminal.

7. The method of claim 6, further comprising stopping the driving of the second light-emitting device when an external sound output device is inserted into the earphone connection terminal.

8. An apparatus for using a portable terminal in a dark environment, the apparatus comprising:

a battery for supplying operation power for the portable terminal;

an illuminance sensor for checking an ambient illuminance of the portable terminal; and a controller for checking a battery level and an ambient illuminance of exterior, wherein a first light emitting device and a second light emitting device correspond to a first terminal and a second terminal, respectively, and driving one of the light-emitting device and the second light emitting device based on the checked battery level and the ambient illuminance.

9. The apparatus of claim 8, wherein the controller drives the first light-emitting device corresponding to the first terminal when the battery level is lower than or equal to a preset level and a level of the ambient illuminance is lower than or equal to a preset level.

10. The apparatus of claim 9, wherein the first terminal is a charging terminal used to charge the battery of the portable terminal.

11. The apparatus of claim 10, wherein the controller stops the driving of the first light-emitting device if the battery is charged or if a charging cable is inserted into the charging terminal.

12. The apparatus of claim 8, wherein the controller drives the second light-emitting device corresponding to the second terminal when the battery level is higher than or equal to a preset level and a level of the ambient illuminance is lower than or equal to a preset level.

13. The apparatus of claim 12, wherein the second terminal is an earphone connection terminal.

14. The apparatus of claim 13, wherein the controller stops the driving of the second light-emitting device when an external sound output device is inserted into the earphone connection terminal.

\* \* \* \* \*

UNITED STATES PATENT AND TRADEMARK OFFICE
CERTIFICATE OF CORRECTION

PATENT NO.        : 9,265,126 B2
APPLICATION NO.   : 13/860733
DATED             : February 16, 2016
INVENTOR(S)       : Won-Wook Lee Page 1 of 1

It is certified that error appears in the above-identified patent and that said Letters Patent is hereby corrected as shown below:

In the claims

Column 7, Claim 8, Line 9 should read as follows:
--...the first light-emitting...--

Signed and Sealed this
Seventeenth Day of May, 2016

Michelle K. Lee
*Director of the United States Patent and Trademark Office*